United States Patent [19]
Paulus et al.

[11] 3,852,471

[45] Dec. 3, 1974

[54] SYNERGISTIC MICROBIOCIDAL COMPOSITION EMPLOYING CERTAIN PHENOLS AND A BENZYL ALCOHOL

[76] Inventors: Wilfried Paulus; Otto Pauli, both of Farbenfabriken Bayer Aktiengesellschaft, Krefeld, Germany

[22] Filed: Oct. 2, 1970

[21] Appl. No.: 77,729

[30] Foreign Application Priority Data
Oct. 8, 1969 Germany............................ 1950677

[52] U.S. Cl................. 424/334, 424/343, 424/347, 71/67, 252/54
[51] Int. Cl.............................................. A01n 9/24
[58] Field of Search ............ 424/334, 346, 343, 347

[56] References Cited
UNITED STATES PATENTS
2,519,565  8/1950  Hallowell............................ 424/334
3,471,576  10/1969  Klesper et al....................... 424/346
3,577,539  5/1971  Vinson................................ 424/346

FOREIGN PATENTS OR APPLICATIONS
718,829  7/1968  Belgium

Primary Examiner—Vincent D. Turner
Attorney, Agent, or Firm—Burgess, Dinklage & Sprung

[57] ABSTRACT

Synergistic combination of reaction products of benzyl alcohols, optionally substituted in the phenyl radical by alkyl, halogen or halolakyl, and 1 to 2 molar equivalents of formaldehyde, with phenols optionally substituted in the phenyl ring by alkyl, phenyl, benzyl, halohydroxybenzyl and/or halogen, which possesses synergistic microbicidal properties especially as bactericides and fungicides.

4 Claims, No Drawings

SYNERGISTIC MICROBIOCIDAL COMPOSITION EMPLOYING CERTAIN PHENOLS AND A BENZYL ALCOHOL

The present invention relates to and has for its objects the provision of new microbicidal compositions in the form of synergistic combinations of certain individually known compounds, which combinations possess outstanding microbicidal properties, optionally in the form of carrier composition mixtures of such synergistic combinations with solid and/or liquid dispersible carrier vehicles, and methods for using such synergistic combinations in a new way especially as bactericides and fungicides, with other and further objects becoming apparent from a study of the within specification and accompanying examples.

It is an object of the present invention to broaden the known (cf. Belgian Pat. Specification No. 718,829) microbicidal effectiveness of the reaction products of benzyl alcohols and formaldehyde. A broadening of the activity spectrum of such reaction compounds is achieved according to the invention when certain phenols are dissolved in the latter.

Accordingly, the present invention provides microbicidal agents with improved bacetricidal and fungicidal effectiveness as well as a broad activity spectrum which comprise a mixture of reaction products of benzyl alcohols, which may be substituted in the phenyl radical by alkyl, halogen or haloalkyl, and 1 to 2 molar equivalents of formaldehyde, with phenols which may be substituted in the phenyl ring by alkyl, phenyl, benzyl, halohydroxybenzyl and/or halogen. The ratio of the reaction product of benzyl alcohol and formaldehyde with phenol being about 3–5:1.

It has, surprisingly, been found that the effectiveness against micro-organisms of the agents according to the invention is substantially stronger then their content of benzyl alcohol-formaldehyde addition product and phenol gives cause to expect.

The reaction product of benzyl alcohol and formaldehyde consists essentially of hemiformals and polyhemiformals of the benzyl alcohol. As disclosed in U.K. Patent Application No. 35331/68, the formaldehyde may be reacted in the form of paraformaldehyde. The reaction is conveniently effected by heating the reactants in the presence of an inert solvent and a basic catalyst, for example, sodium carbonate, potassium carbonate or magnesium oxide.

The aforesaid reaction product may simply be admixed with the phenol to produce the microbicidal agent of the invention.

The microbicidal agents according to the invention are lethal or germ-inhibiting with respect to the most widely different bacteria, e.g., towards *Bact. fluorescens*, *Bact. proteus vulgare*, *Bact. pyocyaneum*, *Bact. subtilis*, *Bact. coli* and *Myc. tuberculosis*, as well as against mold fungi and yeasts such as *Penicillium glaucum*, *Rhizopus nigricans*, *Aspergillus niger*, *Torula utilis*, *Candida crusei* and *Candida albicans*. They can be used with particularly good results both for the disinfection or preservation of drilling and cutting oil emulsions, distempers, emulsion paints, adhesive pastes and wax emulsions, and for the preparation of disinfectants. The agents of the present invention are also suitable for combating algae and slime. The amounts required can readily be ascertained by preliminary experiments.

It is also surprising that the microbicidal agents of the present invention in aqueous dispersions and emulsions do not accumulate in the organic phase in such a manner that micro-organisms vegetating in the aqueous phase are only inadequately inhibited in their growth. The microbicidal agents accordingly to the invention thereby differ advantageously from disinfectants and preservatives based on lipophilic compounds and therefore possess many possible applications which the lipophilic microbicides do not have. They may also be admixed with other microbicidal agents.

The present invention also provides a microbicidal composition containing, as active ingredient, a microbicidal agent of the present invention in admixture with a solid or liquid diluent or carrier. When a liquid diluent or carrier is used, it may contain a surface-active agent.

In many cases, a concentration of microbicide of 0.01 – 0.5 percent, by weight of the composition, has proven adequate.

The present invention also provides a method of combating microbes which comprises applying to the microbes or to a habitat thereof a microbicidal agent of the present invention alone or in the form of a composition containing as active ingredient a microbicidal agent of the invention in admixture with a solid or liquid diluent or carrier.

The invention is illustrated in the following Examples, from which it can be seen to what extent increases of effect as a result of synergism are attained with the microbicidal mixtures according to the invention. Parts are by weight.

The effect increase (E Increase) is calculated as follows:

% E Increase = 200 (Inhib. calc.–Inhib. found)/Inhib. calc.

Inhib. = minimum inhibition concentration in %, determined in an agar nutrient medium.

Inhib. calc. is determined according to the following equation:

Inhib. calc. = $(100 \cdot Inhib._1 \cdot Inhib._2)/(M_1 \cdot Inhib._2 + M_2 \cdot Inhib._1)$ $M_1, M_2$ = % content of the components in the mixture, $Inhib._1, Inhib._2$ = minimum inhibition concentrations (in %) of the components.

EXAMPLE 1

70 parts benzyl alcohol are reacted with 30 parts formaldehyde with the use of catalytic amounts of potassium carbonate, and 80 parts of the reaction product are mixed with 20 parts 2-phenylphenol. The minimum inhibition concentration (Inhib. found) of the mixture is subsequently determined in agar nutrient media with the use of various test organisms, and the percentage effect increase is calculated according to the formula stated above.

In regard to *Rhizopus nigricans*, the E Increase is 100 percent and, in regard to *Aspergillus niger*, 120 percent.

EXAMPLE 2

80 parts of the formaldehyde addition product obtained according to Example 1 are mixed with 20 parts pentachlorophenol, and the mixture obtained is tested as described in Example 1.

The E Increase in regard to *Penicillium glaucum* is 100 percent; in regard to *Rhizopus nigricans*, 100 percent; in regard to *Aspergillus niger*, 100 percent; in regard to *Chaetomium glob. K.*, 54 percent; in regard to *Candida albicans* and in regard to *Torula rubris*, 81 percent.

EXAMPLE 3

80 parts of the formaldehyde addition product obtained according to Example 1 are mixed with 20 parts 4-chloro-3,5-dimethylphenol, and the mixture is tested as in Example 1.

The E Increase in regard to *Penicillium glaucum* is 75 percent, in regard to *Rhizopus nigricans*, 57 percent and in regard to *Aspergillus niger*, 46 percent.

EXAMPLE 4

80 parts 3,4-dichlorobenzyl alcohol are reacted with 20 parts formaldehyde with the use of catalytic amounts of sodium carbonate, and 80 parts of the reaction product are mixed with 20 parts (2,2'-dihydroxy-5,5'-dichloro)-diphenylmethane. The mixture is tested as in Example 1.

The E Increase in regard to *Penicillium glaucum* is 26 percent; in regard to *Rhizopus nigricans*, 64 percent; in regard to *Aspergillus niger*, 50 percent and in regard to *Chaetomium glob. K.*, 78 percent.

EXAMPLE 5

80 parts of the formaldehyde addition product obtained according to Example 4 are mixed with 20 parts 3-methyl-4-chlorophenol; the mixture is tested as in Example 1.

The E Increase in regard to *Chaetomium glob. K.* is 67 percent; in regard to *Bact. coli*, 25 percent and in regard to *Bact. pyocyaneum*, 70 percent.

EXAMPLE 6

80 parts of the formaldehyde addition product obtained according to Example 4 are mixed with 20 parts 2,4,6-tribromophenol; the mixture is tested as in Example 1.

The E Increase in regard to *Penicillium glaucum* and *Rhizopus nigricans* is 85 percent; in regard to *Aspergillus niger* and *Chaetomium glob. K.*, 110 percent.

EXAMPLE 7

70 parts o-tolyl alcohol are reacted with 30 parts formaldehyde with the use of catalytic amounts of potassium carbonate, and 80 parts of the reaction product are mixed with 20 parts 2-benzyl-4-chlorophenol. The mixture is tested as in Example 1.

The E Increase in regard to *Rhizopus nigricans* is 100 percent; in regard to *Bact. coli*, 80 percent and in regard to *Bact. pyocyaneum*, 70 percent.

EXAMPLE 8

80 parts of the formaldehyde addition product obtained according to Example 7 are mixed with 20 parts 2,4,5-trichlorophenol; the mixture is tested as in Example 1.

The E Increase in regard to *Rhizopus nigricans* is 36 percent; in regard to *Chaetomium glob. K.*, 100 percent and in regard to *Bact. coli*, 33 percent.

EXAMPLE 9

80 parts of the formaldehyde addition product obtained according to Example 7 are mixed with 20 parts pentachlorophenol; the mixture is tested as in Example 1.

The E Increase in regard to *Penicillium glaucum* is 45 percent; in regard to *Rhizopus nigricans*, 96 percent; in regard to *Aspergillus niger*, 67 percent and in regard to *Bact. coli*, 40 percent.

The following Examples illustrate, without limitation, the uses of the invention.

EXAMPLE 10

0.15 percent by weight of the mixture described in Example 2 is added to an aqueous emulsion paint which contains, as binder, polyvinyl acetate; it is then germ-free, outstandingly stable in storage and also protected against re-infection; germs as well as bacteria and molds introduced subsequently from a microbially spoiled emulsion paint are killed. Similar results are achieved with paint binders comprising polyvinyl propionate or polyacrylates.

EXAMPLE 11

A conventional drilling oil emulsion used on turning and cutting tools which contains 0.15 percent by weight of the microbicidal mixture described in Example 1 remains stable for months without the disadvantages which go along with microbial decomposition, such as odor nuisance and breaking of the emulsion. In contrast to this, a drilling oil emulsion to which the stated agent has not been added shows, within 2 weeks, signs of decomposition.

EXAMPLE 12

0.03 percent by weight of the mixture described in Example 4 is added to a wax emulsion serving for floor maintenance. The wax emulsion thus treated is very stable in storage and is also able to kill germs of, for example, *Staph. aureus* and *Bact. pyocyaneum*.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. A synergistic bactericidal, mold fungicidal and yeasticidal agent which comprises a mixture containing (1) the product produced by heating a benzyl alcohol selected from the group consisting of benzyl alcohol, 3,4-dichlorobenzyl alcohol and 0-tolyl alcohol and about 1 to 2 times the molar amount of formaldehyde in the presence of a basic catalyst, and (2) a phenol selected from the group consisting of 2-phenyl-phenol, pentachlorophenol, 4-chloro-3,5-dimethyl-phenol, 2,2'-di-hydroxy-5,5'-dichloro-diphenylmethane, 3-methyl-4-chloro-phenol, 2,4,6-tribromo-phenol, 2-benzyl-4-chloro-phenol and 2,4,5-trichloro-phenol, the benzyl alcohol-formaldehyde reaction product being present in about 3 to 5 times the weight of the phenol.

2. The composition according to claim 1 in admixture with a diluent.

3. The composition according to claim 2 containing 0.01 to 0.5% by weight of the synergistic agent.

4. A method of combating bacteria, mold fungi and yeasts which comprises applying thereto or to a habitat thereof a bactericidally, mold fungicidally or yeasticidally effective amount of an agent according to claim 1.

* * * * *